United States Patent Office 2,953,412
Patented Sept. 20, 1960

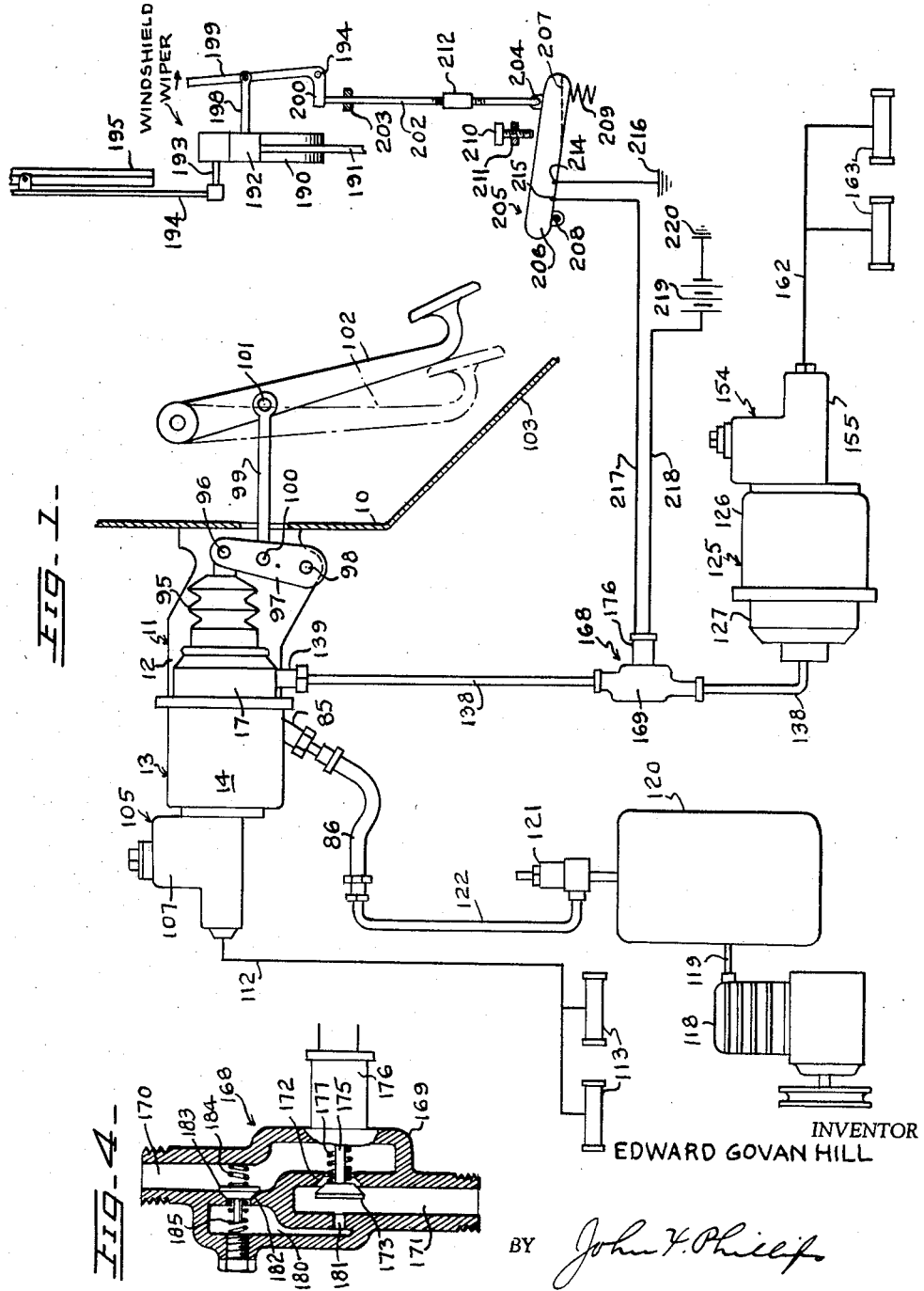

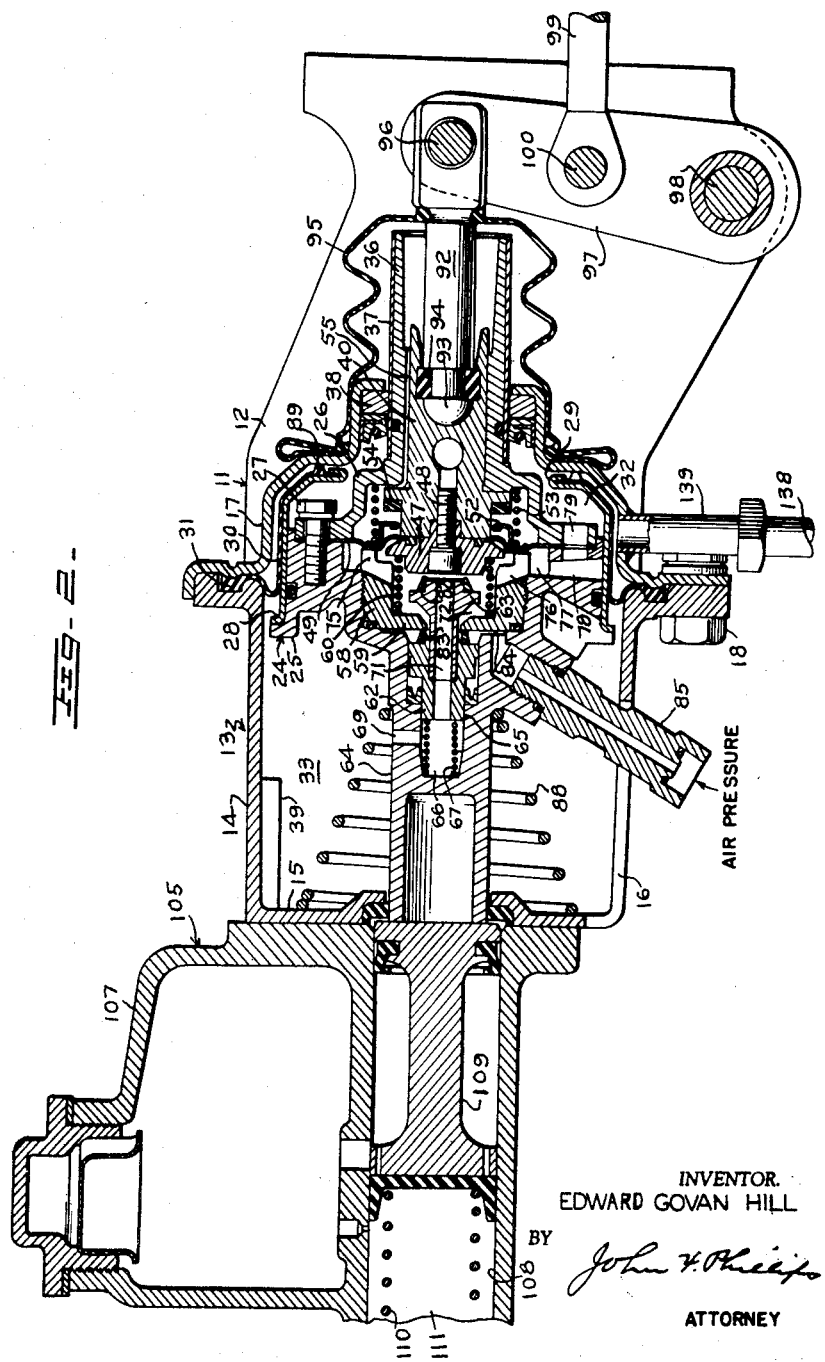

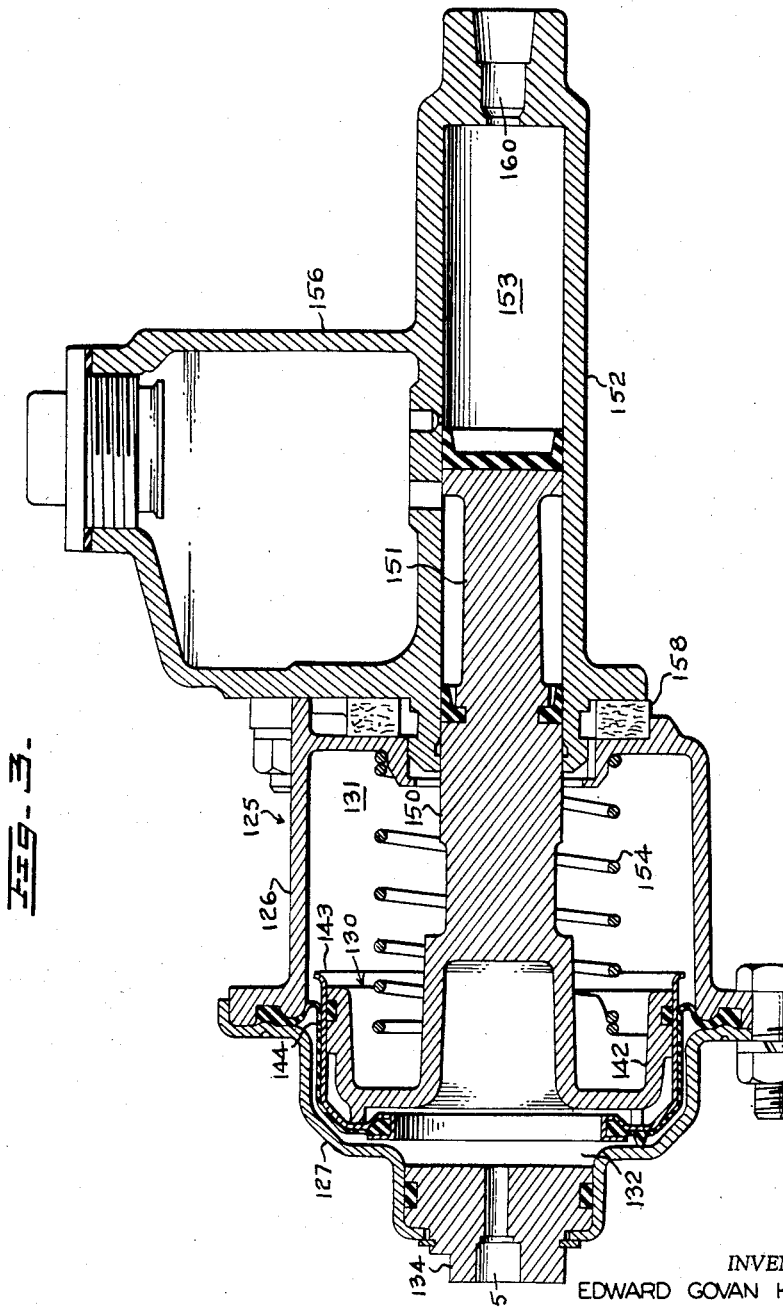

2,953,412

BOOSTER BRAKE MECHANISM WITH ANTI SKID CONTROL

Edward Govan Hill, Birmingham, Mich., assignor to Kelsey-Hayes Company, Detroit, Mich., a corporation of Delaware Filed July 2, 1959, Ser. No. 824,613

14 Claims. (Cl. 303—6)

This invention relates to booster brake mechanisms for motor vehicles.

It has been proposed to provide hydraulic brake systems for motor vehicles wherein separate motor units each have power operable means connected to a pressure generating plunger, one such plunger displacing brake fluid into the front wheel cylinders and the other into the rear wheel cylinders. Such a system is highly advantageous in a passenger vehicle, for example, if a single valve mechanism is employed for controlling both motors with the pedal effort transmitted to the power operable unit of the front wheel brake applying motor with the rear brakes applied solely by the associated motor unit. With such an arrangement braking at the rear wheels is definitely limited in accordance with the maximum energization of the associated motor, accordingly minimizing the locking and sliding of the rear wheels.

In conjunction with such a system it further has been proposed to provide an auxiliary control valve between the motor control valve mechanism and the variable pressure chamber of the rear brake applying motor and to close such valve to limit energization of such motor when the rate of vehicle deceleration increases above a predetermined point. Such an arrangement further minimizes the locking and sliding of the rear wheels. The auxiliary valve device preferably is controlled by a mercury switch inclined forwardly from the horizontal so that a body of mercury, normally in the lower rear end of a mercury tube, moves forwardly by inertia when the rate of vehicle deceleration increases to a predetermined point, in which case a circuit will be closed to a solenoid which operates to close the auxiliary valve device. Such a system is highly advantageous in use but provides for the closing of the auxiliary valve device at a fixed rate of vehicle deceleration, the condition of the highway not being taken into account. Therefore while a system of this character may be highly efficient in operation on a dry highway surface, the rate of vehicle deceleration at which the auxiliary valve device closes may be too high when the highway is slippery, thus permitting the locking and sliding of the rear wheels.

An important object of the present invention is to provide novel means for lowering the rate of vehicle deceleration at which an auxiliary valve device of the character referred to will close, thus providing heavier maximum rear brake application in a passenger vehicle when the latter is being driven over a dry highway surface, and a substantially lowered rate of vehicle deceleration at which the auxiliary valve device will close when the highway surface is wet, thus greatly minimizing the chance that the rear vehicle wheels will lock on a slippery surface.

A further object is to provide such a system wherein a forwardly and upwardly inclined mercury switch is employed for controlling a solenoid for cutting off the supply of fluid pressure to the rear brake booster motor unit, the mercury switch having a normal given inclination from the horizontal for closing the supply of fluid pressure to such motor under dry road conditions, and to provide means for reducing the degree of inclination from the horizontal when the road is slippery.

A further object is to provide novel means in conjunction with a windshield wiper to be operated whenever the wiper is turned on, to reduce the inclination of the mercury switch from its normal angle to said smaller angle relative to the horizontal whereby, when the vehicle operator starts the windshield wiper, he need give no thought to the brake system and the latter will be automatically changed to reduce the rate of vehicle deceleration at which the mercury switch will close.

A further object is to provide such a system wherein the mercury switch has mechanical connection with the handle means which controls the windshield wiper so that, as soon as the windshield wiper is turned on, even at a relatively low speed, the inclination of the mercury switch from the horizontal will be reduced.

Other objects and advantages of the invention will become apparent during the course of the following description.

In the drawings I have shown one embodiment of the invention, particularly intended for use on a passenger vehicle. In this showing:

Figure 1 is a diagrammatic view of the entire brake system showing the association of the latter with the windshield wiper for the controlling of the maximum energization of the rear brake applying motor;

Figure 2 is an enlarged axial sectional view through a super-atmospheric pressure master booster motor for operating the front wheel brakes, a portion of the associated master cylinder being shown;

Figure 3 is a similar view of a slave motor for operating the rear wheel brakes; and Figure 4 is a detail sectional view showing an auxiliary cut-off valve mechanism between the master and slave motors.

The system including a master motor for operating the front wheel brakes and a slave motor for operating the rear wheel brakes of a passenger vehicle, as shown in the present instance, form no part per se of the present invention but are disclosed and claimed in my copending application Serial No. 802,349, filed March 27, 1959. The auxiliary valve device per se for limiting the admission of pressure fluid to the slave motor is generally similar to the corresponding valve mechanism shown in the copending application of Jeannot G. Ingres, Serial No. 595,493, filed July 2, 1956, now Patent No. 2,922,499.

Referring first to Figure 1, the motor vehicle fire wall 10 is provided with a U-shaped bracket 11 fixed against its forward face and having parallel side walls 12 supporting a master booster motor indicated as a whole by the numeral 13. Referring to Figure 2, the motor 13 has a cylindrical forward housing 14 provided with a front end wall 15, the bottom of the housing 14 being slotted as at 16. The motor 13 has a rear housing member 17, the two motor housing members being bolted together as at 18.

A pressure responsive unit indicated as a whole by the numeral 24 is arranged within the motor and comprises body sections 25 and 26 secured together as at 27. The body section 25 has a cylindrical outer surface on which is pressed an annular member 28 extending rearwardly into the housing member 17 and having its radially inner edge 29 crimped over the inner periphery of a rolling diaphragm 30. This diaphragm has an outer peripheral bead 31 clamped between the two motor housing sections 14 and 17. The pressure responsive unit 24 divides the motor to form a variable pressure or control chamber 32 and an atmospheric chamber 33, the latter being open to the atmosphere through the slot 16. The body section 26 has a rearwardly extending sleeve 36 on which is pressed a stainless steel tube 37 slidable through a combined bearing and sealing unit 38, carried by the rear motor housing 17. The motor housing 14 is preferably provided with an abutment 39 to prevent substantial movement of the body section 25 substantially beyond its forward limit of movement, for example, if there should be a failure in the forward brake hydraulic lines, as will become apparent.

A manually operable member 40 slides axially in the sleeve 36 and has a cap member 47 secured thereto by a screw 48. The cap member 47 clamps against the forward end of the member 40 the inner periphery of a diaphragm 49, the outer periphery of which is clamped between the body sections 25 and 26. A reaction washer 52 engages the diaphragm 49 and is biased forwardly with such diaphragm by a spring 53 toward the normal position shown in Figure 2.

The member 40 carries a rubber bumper 54 engageable with the reaction washer 52 when the motor is energized. The sleeve 36 is grooved at 55 to vent to the atmosphere the chamber in which the spring 53 is arranged.

A nut 58 is threaded in the body section 25 and has an internal flange 59 provided with an axial opening therethrough. A spring 60 has its respective ends engaging the flange 59 and cap 47 to urge the latter toward its normal position shown in Figure 2.

A valve unit comprising elements 62 and 63 is axially slidable in the body member 25, and such body member has a forwardly extending axial portion 64 provided with a bore 65 in which the member 62 is slidable. The forward end of the bore 65 forms a chamber 66, and a spring 67 therein biases the members 62 and 63 toward the right in Figure 2. A radial port 69 connects the chamber 66 with the chamber 33 and thus with the atmosphere. The valve members 62 and 63 have an axial passage 71 communicating at its forward end with the chamber 66 and having its rear end opening into a control chamber 72 formed rearwardly of the flange 59.

The nut 58 is provided with a rearwardly extending annular flange 75 normally engaged by the diaphragm 49. The flange 75 is grooved as at 76 to connect the chamber 72 with a radially outer chamber 77, the latter chamber in turn communicating through passages 78 and 79 with the motor chamber 32.

A rubber or similar valve element 82 is carried by the member 63 and projects slightly beyond the rear end thereof. The valve element 82 is normally spaced from, but is engageable with, the cap 47 upon movement of the latter under conditions to be described. The member 62 carries a similar valve element 83 normally engaging the flange 59.

A pressure chamber 84 surrounds the valve element 83 and communicates with a connector 85 extending through the slot 16, the connector 85 being connected to one end of a flexible hose 86 (Figure 1) to which superatmospheric pressure is supplied as described below. The pressure responsive unit 24 is biased to off position by a return spring 88, and movement of the unit to off position is limited by engagement with the motor housing 17 of an annular bumper 89 formed on the diaphragm 30.

A push rod 92 having a hemispherical end 93 maintained in position by a rubber ring 94 imparts movement to the member 40. A boot 95 is connected between the push rod 92 and the motor housing 17.

The motor disclosed in Figure 2 forms per se no part of the present invention except in the general combination defined in the claims. The motor per se is disclosed and claimed in the copending application of David T. Ayers, Serial No. 747,424, filed July 9, 1958.

A pivot pin 96 connects the rod 92 to the upper end of lever 97 having its lower end pivoted as at 98 to the bracket walls 12. A push rod 99 is pivoted at 100 to the lever 97, and the rear end of the push rod (Figure 1) is pivoted as at 101 to a depending pedal lever 102, operable over and rearwardly of a toe board 103. The broken-line position of the pedal in Figure 1 represents the maximum movement of the pedal toward the toe board during normal operation of the motor 13. In the event of a failure in the hydraulic lines to the front brakes, the body section 25 will engage the abutment 39 to limit movement of the pressure responsive unit 24 with the pedal 102 no lower than the broken-line position shown in Figure 1. Under such conditions the valve mechanism of the motor 13 is still subject to operation by the brake pedal, thus providing for the controlling of the slave motor to be described.

A conventional master cylinder 105 is secured to the forward wall 15 of the motor housing 14. The master cylinder comprises a conventional reservoir 107 and master cylinder bore 108 in which is slidable the usual plunger 109. The rear end of this plunger abuts the axial extension 64 of the pressure responsive unit of the motor to be actuated thereby. The plunger 109 is biased rearwardly by the usual spring 110, and the left-hand end of the bore 108 (Figure 2) forms a chamber 111 communicating through lines 112 (Figure 1) with the front wheel cylinders 113.

The motor 13 in the present instance is of the superatmospheric pressure operated type, and to supply such pressure, the vehicle is provided with a suitably driven compressor 118 having its outlet piped as at 119 to a reservoir 120. The outlet of the reservoir has the usual pressure regulating valve 121 piped as at 122 to the other end of the flexible hose 86.

Application of the rear vehicle brakes is accomplished by operation of a slave motor 125 (Figures 1 and 3). Such motor comprises a cylindrical body 126 and a cap member 127 divided by a pressure responsive unit 130 to form an atmospheric chamber 131 and a control chamber 132. The cap member 127 has a fitting 134 provided with an axial opening 135 communicating with the motor chamber 132. This axial opening is connected to one end of a pipe 138, and the other end of this pipe connects with a fitting 139 communicating with the control chamber 32 of the motor 13. Pressure in the latter chamber normally will be communicated through the pipe 138 to the slave motor chamber 132. However, such communication may be cut off by an auxiliary control valve device further described below.

The pressure responsive unit 130 is provided with a preferably die cast body 142 on which is pressed a shell 143. A rolling diaphragm 144 is mounted on the shell 143 and rolls thereover, and is connected at its respectively inner and outer peripheries to the motor casing members 126 and 127.

The body 142 is provided with an axial extension 150 terminating in a master cylinder plunger 151 operating in a master cylinder 152 to generate pressure in the chamber 153 upon operation of the slave motor. The pressure responsive unit 130, including the plunger 151, is biased to off position by a return spring 154. The master cylinder 152 is provided with the usual reservoir 156, and between the master cylinder unit and the motor housing member 126 is interposed an air cleaner 158. The master cylinder 152 is provided with an outlet 160 communicating through lines 162 (Figure 1) with the rear wheel brake cylinders 163.

An auxiliary valve device indicated as a whole by the numeral 168 is interposed in the pipe 138. The valve device 168 comprises a cast body 169 (Figure 4) having chambers 170 and 171 respectively communicating with the upper and lower ends of the pipe 138 as viewed in Figure 1. Communication between the chambers 170 and 171 is controlled through a valve seat 172 associated with a valve 173, normally open as shown in Figure 4. The valve 173 is carried by a stem 175 forming the armature of a solenoid 176, and the valve 173 is biased to open position by a spring 177.

The body 169 is further provided with a chamber 180 in fixed communication with the chamber 171 through a port 181. Communication between the chambers 180 and 170 is controlled through a valve seat 182 normally engaged by a valve 183. This valve is engaged on opposite sides by springs 184 and 185 providing a net force lightly biasing the valve 183 to closed position.

Referring to Figure 1, there is disclosed means for controlling the solenoid 176 and hence the valve 173 in accordance with the operability of the windshield wiper of the motor vehicle, the result being to control the valve device 168 to substantially limit energization of the slave motor 125 to prevent the rear wheels from locking when the road is wet and the windshield wiper is working. The wiper motor is indicated by the numeral 190 and, if of the vacuum type, will be provided with a suitable vacuum line 191. Communication between such line and the motor 190 will be controlled by a valve mechanism (not shown) of conventional type, housed in a portion 192 of the windshield wiper motor. This motor, when operating, oscillates a shaft 193 to which is fixed a wiper arm 194 carrying a blade 195.

The motor 190 is diagrammatically shown in the present instance as having its valve mechanism controlled by a push rod 198 connected to a lever 199 pivotally supported as at 194. The lever 199 is shown in off position and has its upper end movable to the right to operate the windshield wiper. It will be apparent that the windshield wiper may be either vacuum or electrically operated and that movement of the lever 199 to the right will control the speed of the windshield wiper motor 190. The lever 199 carries at its lower end an arm 200 which swings upwardly when the lever 199 is swung to the right to start the motor 190.

The lower edge of the arm 200 is normally engaged by the upper end of a push rod 202 slidable in a guide 203. The lower end of the rod 200 is connected as at 204 to one end of a mercury switch 205 comprising a tubular casing 206 containing a body of mercury 207. The tubular body 206 slopes downwardly and rearwardly and, accordingly, the mercury is normally arranged in the rear end of the tubular body. The opposite end of the body 206 is pivotally supported as at 208, and beneath the rear end of the body 206 is arranged a spring 209 which biases the rear end of the body 206 upwardly to maintain the upper end of the rod 202 in contact with the arm 200. Upward movement of the rear end of the tubular body 206 is limited by engagement with an adjustable screw 210 threaded in a supporting member 211. The normal angularity of the body 206 to the horizontal and accordingly the angle of movement of this body before it engages the screw 210 may be adjusted by turning a turnbuckle 212 in the rod 202.

Adjacent its upper end, the body 206 is provided with a pair of contacts 214 and 215 the former of which is grounded as at 216. The contact 215 is connected by a wire 217 to one terminal of the solenoid 176. The other terminal of the solenoid is connected by a wire 218 to one terminal of the vehicle battery 219 having its other terminal grounded as at 220.

Operation

As previously stated, the system including the master motor 13 and slave motor 125 and associated elements forms no part per se of the present invention but is disclosed in my copending application Serial No. 802,349, referred to above. The parts of the master motor normally occupy the positions shown in Figure 2, the control chamber 32 of the motor being open to the atmosphere through the various ports, passages and chambers 79, 78, 77, 76, 72, 71, 66, 69 and 33, the latter chamber being open to the atmosphere through the slot 16. Air pressure, constantly present in the fitting 85, is cut off from communication with the control chamber 32 at the valve 83, this valve being normally closed.

The master motor is operated by depressing the pedal 102 (Figure 1) to move the rod 99 to the left, thus rocking the lever 97 (Figure 2) to move the push rod 92 and operate the member 40. The cap member 47 will engage the valve 82 to close communication between the chamber 72 and the axial atmospheric passage 71. Further movement of the parts will unseat the valve 83, thus admitting air pressure from the chamber 84 into the chamber 72 and thus into the control chamber 32 through the ports and passages identified above.

The admission of pressure into the chamber 32 moves the pressure responsive unit 24 to the left to impart movement to the master cylinder plunger 109, thus displacing fluid from the chamber 111 through lines 112 (Figure 1) to the wheel cylinders 113, these being the front wheel cylinders where the system is used on a passenger vehicle.

In accordance with the disclosure in the copending application referred to, the master motor is provided with a "soft" initial pedal, and at a given point in the operation of the parts, the cap member 47 engages the shouldered member 75 so that pedal effort is added to the power of the master motor 13 to operate the wheel cylinders 113. Pressure in the control chamber 32 flows through pipe 138, past normally open valve 173 (Figure 4) into the chamber 170, thence through the lower end of the pipe 138 into the chamber 132 (Figure 3) of the slave motor. The same pressure which exists in the chamber 32 of the motor 13 thus will operate the pressure responsive unit 130 of the slave motor to move the plunger 151 to the right in Figure 3. Fluid will be displaced from the chamber 153 through lines 162 to the wheel cylinders 163, which will be the wheel cylinders for the rear wheels of a passenger vehicle. It will be apparent that a lower maximum pressure will be generated in the wheel cylinders 163 than in the wheel cylinders 113 since the slave motor is operated solely by fluid pressure without any assistance from the brake pedal. Accordingly the locking and sliding of the rear wheels of the vehicle will be minimized.

The system is so designed that the pressure in the control chamber 132 of the slave motor will not provide sufficient braking at the rear wheels of a passenger vehicle to lock such wheels on a dry road, under average braking conditions. Where such locking of the wheels takes place, substantial braking effort at the rear wheels is lost, thus reducing the maximum rate of vehicle deceleration.

Assuming that a very substantial brake application is made, such as in a "panic" stop, the operation of the valve mechanism of the master motor may raise the pressure in the slave motor chamber 132 to the maximum possible pressure and, if this occurs too rapidly, the rear wheels of the vehicle may be locked. Assuming that such brake application is made, the rate of vehicle deceleration will be quite high, in which case the inertia of the body of mercury 207 will cause the mercury to move forwardly in the body 206 and close the circuit across the contacts 214 and 215. This action will occur before maximum energization of the slave motor takes place, and results in the energization of the solenoid 176 and the closing of the valve 173 (Figure 4). Accordingly, the admission of pressure to the slave motor will be cut off prior to the maximum energization of such motor, and the locking of the rear vehicle wheels will be prevented.

If, upon the closing of the valve 173, the operator then releases the brake pedal, the valve parts in Figure 2 will return to normal position and the motor control chamber 32 will be immediately connected to the atmosphere through the various ports, passages and chambers previously described. However, there will not be an instantaneous opening of the valve 173 since this will depend upon de-energization of the solenoid 176 and there will be a slight lag in the rearward flowing of the mercury 207 to open the circuit at the contacts 214 and 215. Accordingly, there will be slight sluggishness in the releasing of the rear brakes since, momentarily, pressure will be trapped in the chamber 132 of the slave motor. However, under such conditions, the valve 183 acts as a pressure release valve to open communication through the pipe 138 (Figure 1) to immediately release pressure from the slave motor. This feature per se forms no part of the present invention but is disclosed and claimed in the copending application of Jeannot G. Ingres, Serial No. 595,493, now Patent No. 2,922,499, referred to above.

It is desirable to reduce the rate of vehicle deceleration at which the valve 173 will close when it is raining and the highway is wet, since the point at which the valve 173 normally closes may result in energizing the slave motor to such an extent that the rear wheels may be locked. In the present invention, the mercury switch and its functioning are combined with the windshield wiper of the vehicle. The turnbuckle 212 may be adjusted to predetermine the normal angle of the body 206 to the horizontal to determine the normal rate of vehicle deceleration at which the valve 173 will close. If it starts to rain, the operator will pull rearwardly on the handle or lever 199 to start the windshield wiper 190, in which case the arm 200 will move upwardly to release pressure from the upper end of the rod 202. The spring 209 will then move the tubular body 206 upwardly until it engages the lower end of the screw 210. So long as the windshield wiper is in operation, therefore, the inclination of the tubular member 206 to the horizontal will be reduced and a substantially lower rate of vehicle deceleration will cause the body of mercury 207 to move forwardly and close the circuit across the contacts 214 and 215. When this occurs, therefore, the solenoid 176 will be energized to close communication through the pipe 138. No further pressure then may be built up in the slave motor chamber 132, and this pressure will be substantially less than will be built up in the normal functioning of the 173 when the tubular member 206 is in the normal position shown in Figure 1.

With the present system, therefore, it will be apparent that in the normal functioning of the parts on a dry highway, the locking of the rear vehicle wheels will be prevented, upon a sudden substantial brake application, by the closing of the valve 173. This operation takes place upon a predetermined rate of vehicle deceleration. This rate is dependent upon the angularity to the horizontal of the tubular body 206, which angle may be adjusted by turning the turnbuckle 212. As soon as the windshield wiper is turned on, however, the inclination of the tubular member 206 to the horizontal is substantially reduced and a different and lower rate of vehicle deceleration will result in the closing of the circuit through the solenoid 176. Thus the valve 173 will function to prevent the admission of such pressures to the chamber 132 of the slave motor as would result in the locking of the rear wheels. Thus two different rates of vehicle deceleration will affect the slave motor, and this is accomplished with no attention on the part of the operator. It requires merely the turning on of the windshield wiper to provide for an automatic reduction in the maximum energization of the slave motor upon a sudden substantial operation of the brake pedal.

The present system therefore provides a high degree of safety in brake operation on motor vehicles on both dry and wet roads. The windshield wiper may be of either the vacuum or electrical type and, in either case, the degree of movement to the right of the upper end of the lever 199 will determine the speed of operation of the wiper. However, initial movement of the lever 199 to the first speed of operation of the wiper motor will release the rod 202 to result in the change in the angularity of the tubular member 206. Upward movement of the right-hand end of the member 206 is limited by the screw 210, and the handle 199, without affecting the mercury switch, may be moved as far as necessary to provide the desired speed of operation of the windshield wiper, the arm 200 merely moving away from the upper end of the rod 202.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. Control mechanism for a motor vehicle having a plurality of sets of wheel cylinders, comprising a pair of fluid pressure motor units each having a pressure responsive unit forming therewith a control chamber, a fluid displacing device connected to each pressure responsive unit, one such device being connected to one set of wheel cylinders and the other being connected to the remaining wheel cylinders, a valve mechanism having fluid connection with high and low pressure sources and communicating with the variable pressure chambers of both motors, there being a duct to provide such communication between said valve mechanism and the variable pressure chamber of one motor, an inertia-controlled valve device connected in said duct to prevent admission of fluid from said high pressure source to the variable pressure chamber of said one motor when the rate of vehicle deceleration has increased to a predetermined point, a windshield wiper having a control handle, and means connected to be operated by said handle when the windshield wiper is operating for reducing the rate of vehicle deceleration at which said inertia-controlled valve operates to prevent admission of fluid to the variable pressure chamber of said one motor.

2. A mechanism according to claim 1 wherein said inertia-controlled valve device comprises a circuit including a switch having an elongated casing inclined upwardly and forwardly from the horizontal, an inertia body in said casing movable forwardly under the influence of vehicle deceleration, and contacts in said circuit engageable by said body when it moves forwardly in said casing, said means comprising a connection between said handle and said casing for decreasing the angle of the latter from the horizontal when said windshield wiper is operating.

3. Control mechanism for a motor vehicle having a plurality of sets of wheel cylinders, comprising a pair of fluid pressure motor units each having a pressure responsive unit forming therewith a control chamber, a fluid displacing device connected to each pressure responsive unit, one such device being connected to one set of wheel cylinders and the other being connected to the remaining wheel cylinders, a valve mechanism having fluid connection with high and low pressure sources and communicating with the variable pressure chambers of both motors, there being a duct to provide such communication between said valve mechanism and the variable pressure chamber of one motor, a normally open valve in said duct, a solenoid connected to said valve and energizable for closing it, a circuit for said solenoid including an inertia-responsive switch normally operable upon a predetermined rate of vehicle deceleration for closing said circuit, a windshield wiper having a control handle, and means connected between said control handle and said switch for rendering the latter operative upon a lower rate of vehicle deceleration when said windshield wiper is operating.

4. A mechanism according to claim 3 wherein said switch is a mercury switch having a tubular casing inclined forwardly and upwardly and having spaced contacts in said circuit, and a body of mercury in said tubular casing normally movable forwardly upon said predetermined rate of vehicle deceleration to close a circuit across said contacts, said means comprising a mechanical connection between said handle and said tubular casing.

5. A mechanism according to claim 3 wherein said switch is a mercury switch having a tubular casing inclined forwardly and upwardly and having spaced contacts in said circuit, a body of mercury in said tubular casing normally movable forwardly upon said predetermined rate of vehicle deceleration to close a circuit across said contacts, and means biasing said tubular casing for movement to reduce its angle to the horizontal, said means comprising a rod connected to said tubular casing, said handle having a member normally engaging said rod and holding it against said biasing means and operative to release said rod when said handle is moved to operate said windshield wiper.

6. A mechanism according to claim 3 wherein said switch is a mercury switch having a tubular casing inclined forwardly and upwardly and having spaced contacts in said circuit, a body of mercury in said tubular casing normally movable forwardly upon said predetermined rate of vehicle deceleration to close a circuit across said contacts, and means biasing said tubular casing for movement to reduce its angle to the horizontal, said means comprising a rod connected at one end to said tubular casing, said handle having a portion normally in abutting engagement with the other end of said rod to hold it against said biasing means whereby when said handle is moved to operate said windshield wiper, said biasing means will move said casing toward horizontal position, and means for limiting such movement of said tubular casing.

7. A mechanism according to claim 6 provided with means in said rod for varying the length thereof to fix the normal angularity of said tubular casing to the horizontal when said handle is in normal position.

8. Control mechanism for a motor vehicle having a plurality of sets of wheel cylinders, comprising a pair of master cylinders connectible respectively with said sets of wheel cylinders, a plunger in each master cylinder, a pair of fluid pressure motor units each having a pressure responsive unit therein connected to one of said plungers to operate it, each motor unit having a control chamber at one side of its pressure responsive unit, a single valve mechanism connected to sources of relatively high and low pressures and communicating with the control chambers of both motor units, there being a duct through which said valve mechanism communicates with the control chamber of one motor unit, a pedal, force transmitting means connected to simultaneously effect force transmission from said pedal to said valve mechanism and to the plunger associated with the other of said motors units to assist the latter in moving such plunger, a normally open auxiliary valve in said duct, inertia-responsive means for closing said auxiliary valve when the rate of vehicle deceleration increases to a predetermined point, a windshield wiper having a control handle, and means connected between said wiper motor and said inertia-responsive means for lowering the rate of vehicle deceleration at which such means operates to close said auxiliary valve.

9. A mechanism according to claim 8 wherein said inertia responsive means comprises an electrical control circuit including a switch having an elongated casing inclined upwardly and forwardly from the horizontal, an inertia body in said casing movable forwardly under the influence of vehicle deceleration, and contacts in said elongated casing engageable with said inertia body when it moves forwardly in said casing, said means comprising a connection between said handle and said casing for decreasing the angle of the latter from the horizontal when said windshield wiper is operating.

10. Control mechanism for a motor vehicle having a plurality of sets of wheel cylinders, comprising a pair of master cylinders connectible respectively with said sets of wheel cylinders, a plunger in each master cylinder, a pair of fluid pressure motor units each having a pressure responsive unit therein connected to one of said plungers to operate it, each motor unit having a control chamber at one side of its pressure responsive unit, a single valve mechanism connected to sources of relatively high and low pressures and communicating with the control chambers of both motor units, there being a duct through which said valve mechanism communicates with the control chamber of one motor unit, a normally open valve in said duct, a solenoid connected to said valve and energizable for closing it, a circuit for said solenoid including an inertia-responsive switch normally operable upon a predetermined rate of vehicle deceleration for closing said circuit, a windshield wiper having a control handle, and means connected between said control handle and said switch for rendering the latter operative upon a lower rate of vehicle deceleration when said windshield wiper is operating.

11. A mechanism according to claim 10 wherein said switch is a mercury switch having a tubular casing inclined forwardly and upwardly and having spaced contacts in said circuit within the forward end of said tubular casing, and a body of mercury in said tubular casing normally movable forwardly upon said predetermined rate of vehicle deceleration to close a circuit across said contacts, said means comprising a mechanical connection between said handle and said tubular casing.

12. A mechanism according to claim 10 wherein said switch is a mercury switch having a tubular casing inclined forwardly and upwardly and having spaced contacts in said circuit within the forward end of said tubular casing, a body of mercury in said tubular casing normally movable forwardly upon said predetermined degree of vehicle deceleration to close a circuit across said contacts, and means biasing said tubular member for movement to reduce its angle to the horizontal, said means comprising a rod connected to said tubular casing, said member normally engaging said rod and holding it against said biasing means and operative to release said rod when said handle is moved to operate said windshield wiper.

13. A mechanism according to claim 10 wherein said switch is a mercury switch having a tubular casing inclined forwardly and upwardly and having spaced contacts in said circuit within the forward end of said tubular casing, a body of mercury in said tubular casing normally movable forwardly upon said predetermined rate of vehicle deceleration to close a circuit across said contacts, and means biasing said tubular member for movement to reduce its angle to the horizontal, said means comprising a rod connected at one end to said tubular casing, said handle having a portion normally in abutting engagement with the other end of said rod to hold it against said biasing means whereby when said handle is moved to operate said windshield wiper, said biasing means will move said casing toward horizontal position, and means for limiting such movement of said tubular casing.

14. A mechanism according to claim 13 provided with means in said rod for varying the length thereof to fix the normal angularity of said tubular casing to the horizontal when said handle is in normal position.

References Cited in the file of this patent

UNITED STATES PATENTS

| | | |
|---|---|---|
| 2,807,338 | Jankauskas | Sept. 24, 1957 |
| 2,845,147 | Hill | July 29, 1958 |
| 2,876,044 | Hill | Mar. 3, 1959 |